(12) United States Patent
Chapman et al.

(10) Patent No.: US 7,213,991 B2
(45) Date of Patent: May 8, 2007

(54) FLEXIBLE FOLDABLE KEYBOARD

(75) Inventors: Christopher Chapman, Watlington (GB); David Lee Sandbach, London (GB); Stuart Walkington, St. Albans (GB); Timothy Charles Andrew Fitzgerald, Sevenoaks (GB)

(73) Assignee: Eleksen Limited, Hemel Hempstead, Hertfordshire (GB)

( * ) Notice: Subject to any disclaimer, the term of this patent is extended or adjusted under 35 U.S.C. 154(b) by 62 days.

(21) Appl. No.: 10/507,324

(22) PCT Filed: Mar. 11, 2003

(86) PCT No.: PCT/GB03/01038

§ 371 (c)(1),
(2), (4) Date: May 27, 2005

(87) PCT Pub. No.: WO03/079169

PCT Pub. Date: Sep. 25, 2003

(65) Prior Publication Data

US 2005/0238405 A1    Oct. 27, 2005

(30) Foreign Application Priority Data

Mar. 12, 2002   (GB)   ................................. 0205716.4

(51) Int. Cl.
*B41J 5/00*   (2006.01)
(52) U.S. Cl. .......................... 400/472; 400/88; 400/492
(58) Field of Classification Search .................. 400/88, 400/472; 345/156, 168, 169, 179, 182
See application file for complete search history.

(56) References Cited

U.S. PATENT DOCUMENTS 6,168,331 B1    1/2001   Vann
6,317,313 B1 *  11/2001  Mosgrove et al. .......... 361/680
6,452,479 B1    9/2002   Sandbach
6,632,037 B2 *  10/2003  Lin et al. ..................... 400/472
2003/0146902 A1  8/2003  Sandbach et al.

FOREIGN PATENT DOCUMENTS

| WO | WO 99/21077 | 4/1999 |
| WO | WO 00/60438 | 10/2000 |
| WO | WO 01/44910 | 6/2001 |
| WO | WO 01/59975 | 8/2001 |
| WO | WO 01/75572 | 10/2001 |
| WO | WO 01/75575 | 10/2001 |
| WO | WO 01/75922 | 10/2001 |
| WO | WO 01/88683 | 11/2001 |

* cited by examiner

*Primary Examiner*—Judy Nguyen
*Assistant Examiner*—Wynn Q. Ha
(74) *Attorney, Agent, or Firm*—Richard M. Goldberg

(57) ABSTRACT

A flexible foldable keyboard apparatus includes a flexible foldable keyboard (101) having a key defining plane (102), an interface device and phone supporting device (103). The phone supporting device (103) is arranged to unfold from a storage configuration, in which the phone supporting device (103) is folded onto the key defining plane (102) to allow the key defining plane (102) to be wrapped around the phone supporting device (103), to present a telephone supporting configuration, in which the phone supporting device (103) is configured to receive a mobile telephone (401). The phone supporting device (103) is configured to support a mobile telephone (401) in an orientation in which an electrical connection is provided between the interface device and the electrical connectors of the mobile telephone (401), such that the mobile telephone (401) and the flexible foldable keyboard (101) are in electrical communication.

18 Claims, 8 Drawing Sheets

FLEXIBLE FOLDABLE KEYBOARD

BACKGROUND OF THE INVENTION

1. Field of the Invention

The present invention relates to a flexible foldable keyboard apparatus configured to communicate with a mobile telephone.

2. Description of the Related Art

The transmission of text messages using cellular mobile telephones is well established. Under the GSM system for example, it is possible to transmit relatively large volumes of data usually obtained from an external processing environment, such as a laptop computer. In addition, the GSM recommendations also provide for smaller messages to be generated directly from the keyboard of the mobile telephone using the short message services (SMS) facility. Thus, SMS messaging, or "texting" has an advantage in that it is not necessary to provide additional processing systems given that the message may be generated exclusively by the component mobile telephone itself. However, a disadvantage of SMS messaging is that typical keyboards for mobile telephones do not facilitate the generation of text messages.

It has been appreciated that many users would make greater use of SMS messaging if the generation of text data could be made easier without impacting upon the inherent portability of the mobile telephone device.

BRIEF SUMMARY OF THE INVENTION

According to a first aspect of the present invention, there is provided a flexible foldable keyboard apparatus configured to communicate with a mobile telephone, comprising a key defining flexible plane; an interface device configured to connect with the electrical connectors of a mobile telephone; and telephone support means, wherein said telephone support means is arranged to unfold from said flexible plane to present a telephone supporting configuration for a mobile telephone and, after removing a secured mobile telephone, said telephone support means is arranged to fold onto said key defining plane into a storage configuration, to allow said key defining plane to be wrapped around said folded telephone support means; and said telephone support means is configured to allow an electrical connection between said interface device and the electrical connectors of a mobile telephone only when said mobile telephone is located in a correct orientation.

In a preferred embodiment, the telephone support means includes a front portion and a rear portion connected by a hinge, wherein the telephone is received between the front portion and the rear portion. Preferably, the mobile telephone may only be received within the support device when the support device is in its fully unfolded configuration.

According to a second aspect of the present invention, there is provided a method of communicating text data to a mobile telephone using a flexible foldable keyboard, comprising the steps of unfolding a telephone support means from a flexible plane so as to present a telephone supporting configuration for a mobile telephone; locating said telephone within said unfolded telephone support means in a correct orientation; manually operating keys defined with said flexible plane to input data; removing said telephone from said unfolded telephone support means; folding said telephone support means onto said key defining plane; and wrapping said key defining plane around said folded telephone support means.

WRITTEN DESCRIPTION OF THE BEST MODE FOR CARRYING OUT THE INVENTION

FIG. 1

Figure 1:
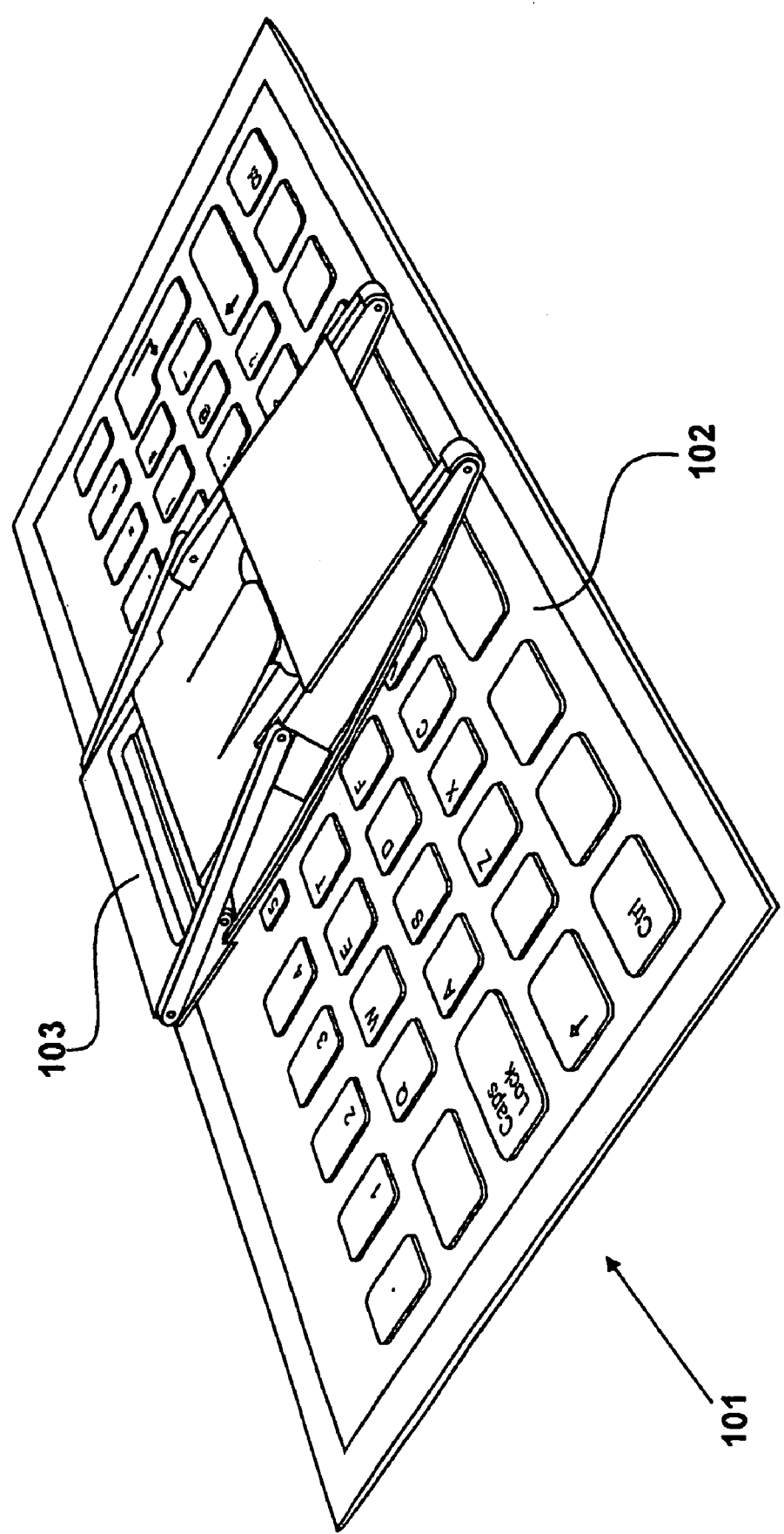
FIG. 1 shows a flexible foldable keyboard, with a telephone support device.

A flexible foldable keyboard 101 is shown in FIG. 1. The keyboard has a key defining flexible plane 102 on which key positions are slightly raised and have text printed thereon. Alternatively, the keys could be left flat without being raised up from the flat plane of the keyboard. The apparatus also includes a telephone support device 103, for receiving a mobile cellular telephone of a type capable of transmitting text data by wireless means. This includes data transmissions in accordance with the GSM standard and text messages sent using the small message services (SMS) provision of GSM. Furthermore, larger documents may be supplied using GPRS standards, including multi-messaging services (MMS). Furthermore, mobile telephones are becoming available that have additional functionality such as that provided by personal digital assistants (PDAs). Thus, in accordance with these platforms, running independent applications, it is possible to generate e-mails and text documents that could then be transmitted over the telephony connection for reception by colleagues or associates using similar platforms or for dissemination within a network environment for further application on, for example, office or personal computers.

Mobile telephones include electrical connectors to facilitate the transmission of data with external devices and the foldable keyboard apparatus is provided with an interface device configured to connect with the electrical connectors of a mobile telephone. In addition, the device may also be provided with means for recharging the mobile telephone while positioned within the support device 103 when the support device 103 is arranged in a supporting configuration. The device may also include an electrical storage battery which may be recharged from an external power supply. Consequently, it is possible for an internal battery for the keyboard device to be recharged in parallel with a telephone recharging operation.

FIG. 2

Figure 2:
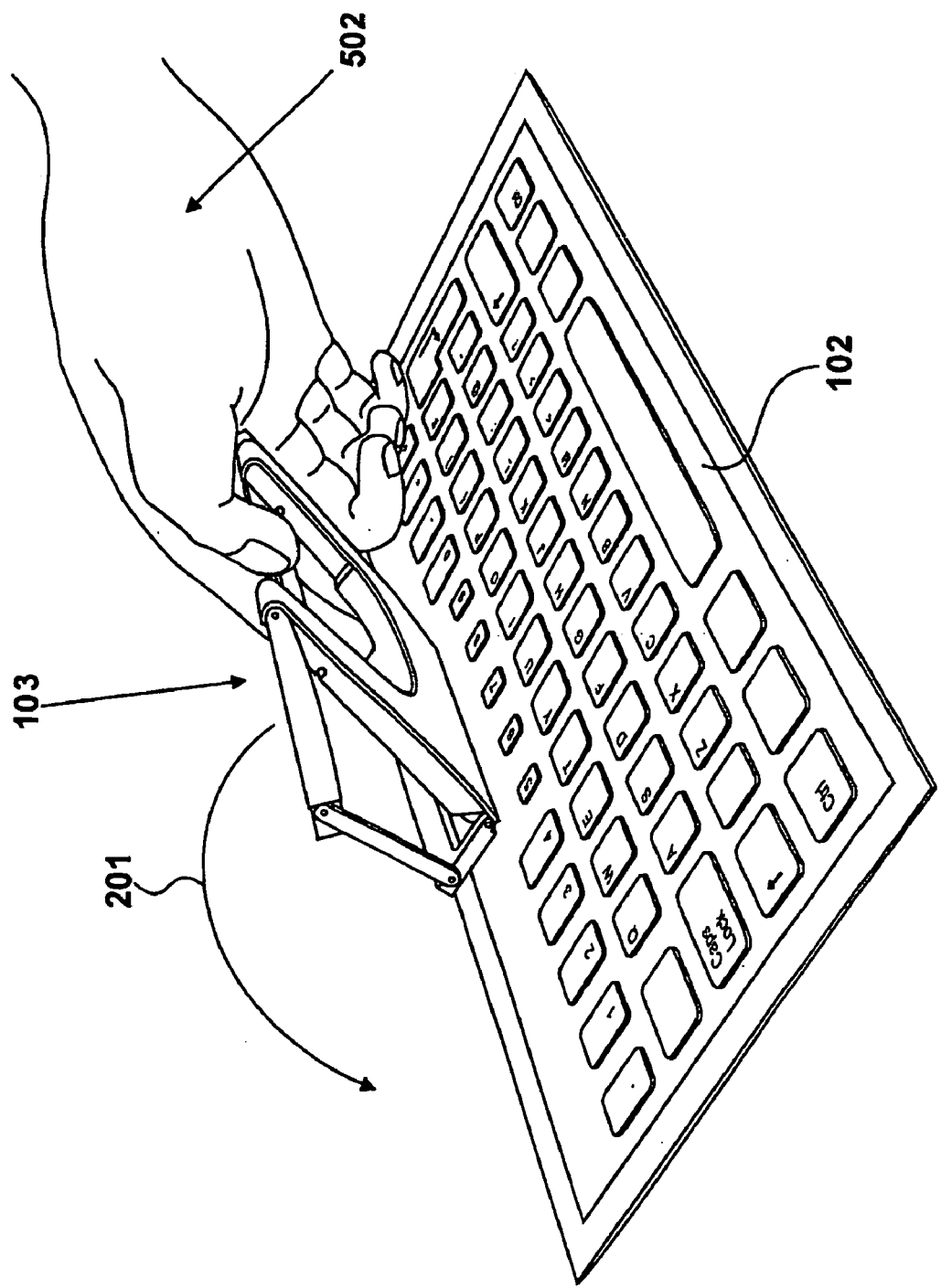
FIG. 2 shows the unfolding of said support device.
Figure 3:
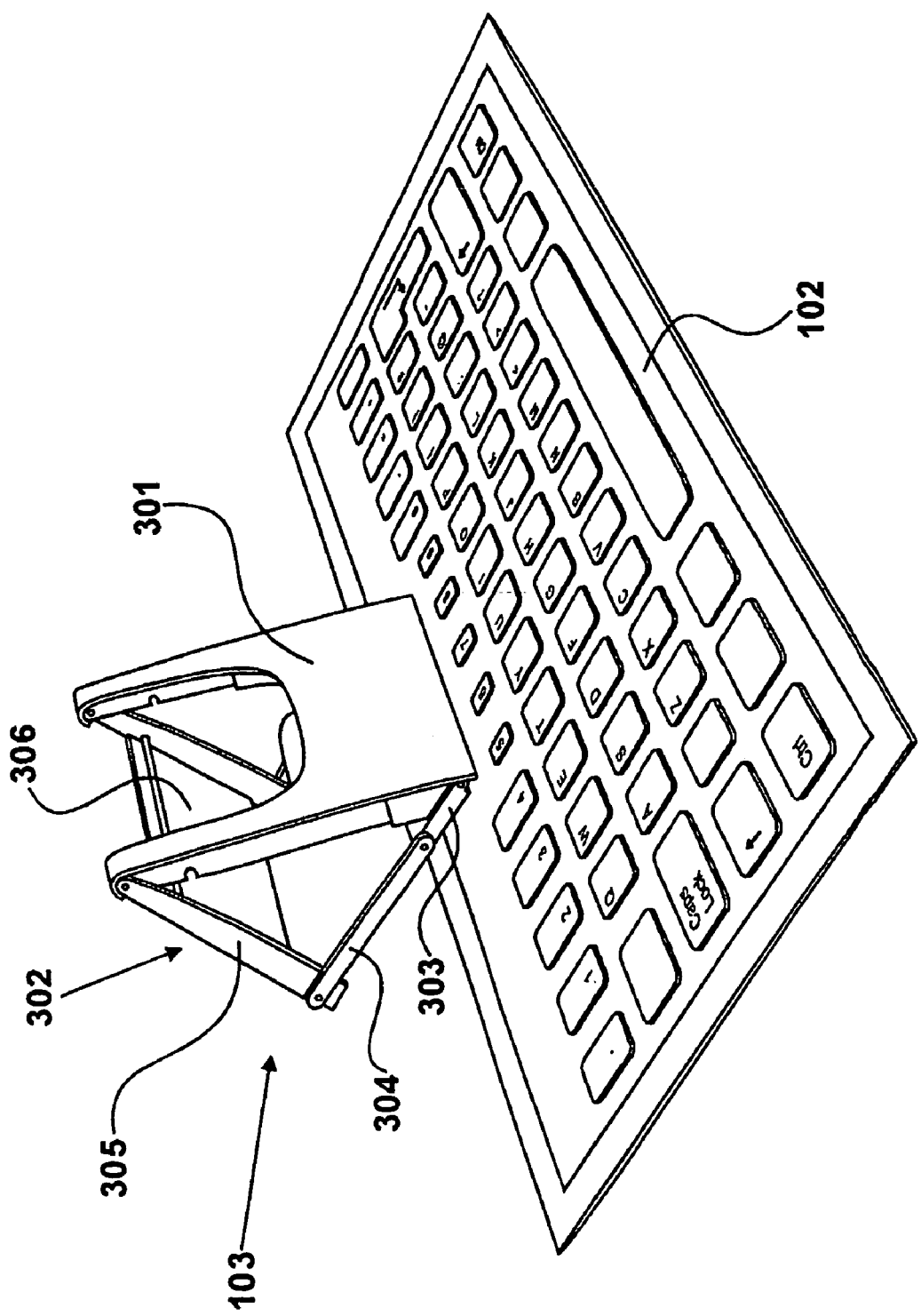
FIG. 3 shows the support device in its unfolded configuration.

In response to manual operation, as illustrated in FIG. 2, the support device 103 is arranged to unfold, as shown generally by arrow 201, from the flexible keyboard plane 102 such that, when completely unfolded, the telephone support device 103 presents a telephone supporting configuration, as illustrated in FIG. 3.

FIG. 3

When completely unfolded into its phone supporting configuration, the phone support device 103 defines a front supporting element 301 and a rear supporting element 302. In addition, the phone supporting device includes a base connecting sub-assembly 303 and an extension arm 304. The base connecting sub-assembly 303 provides physical connection to the key defining flexible plane 102 and also provides support for the base of the telephone. In addition, the base connecting section 303 also protects electrical connections between the key defining flexible plane 102 and the electrical interface to the mobile telephone.

The rear supporting element 302 consists of two substantially vertical elements 305 connected by a horizontal element 306. A mobile telephone is inserted into the support device and held between the front supporting element 301 and the rear element 302. The space between elements 301 and 302 is such that a mobile telephone can only be inserted when the supporting apparatus is fully erect. This ensures that the phone is inserted in a preferred orientation so as to ensure that the connection between electrical connectors of the support device and electrical connectors of the mobile phone meet in a preferred orientation thereby ensuring that no damage is introduced to the connectors of either party. Thus, the telephone support device may define a correct orientation for a mobile telephone, such that the telephone support device allows an electrical connection between the electrical connectors of the mobile telephone and an interface device only when the mobile telephone is located in the correct orientation. It is also preferable for the supporting device to be relatively thin when in its folded configuration so as to minimise the overall size of the device when the keyboard is wrapped. However, when in its open configuration, the aperture presented for receiving the telephone must be sufficient to connect with the full depth of the telephone.

FIG. 4

In use, a cellular mobile telephone 401 is located between the front supporting element 301 and the rear supporting element 302. Operation of the keyboard occurs substantially as described in international patent application WO 00/72239, assigned to the present assignee, the contents of which are incorporated herein by reference. The contents of United States pending patent application Ser. No. 09/744, 155 are also incorporated herein by reference.

In summary, the key defining flexible plane 102 includes a plurality of electrically conducting fabrics such that by establishing potential gradients across said fabrics, it is possible to identify the location of a mechanical interaction. Electrical power for the provision of this functionality is derived from the storage batteries of the mobile telephone. Processing devices attached to the base connecting sub-assembly 303 are configured to identify key press locations and interaction extent by voltage and current measurement. This information is conveyed to the mobile telephone whereupon program instructions held within the mobile telephone are configured to convert these positions and extent values into key press locations. In this way, it is possible for text data to be supplied to the mobile telephone via the flexible keyboard 102 in preference to using the key pad 402 of the mobile telephone 401. However, given that the mobile telephone 401 is supported firmly between the front supporting element 301 and the rear supporting element 302, it is possible for keys of keypad 402 on the mobile telephone to be used by a user in a one handed manner given that the phone support device 103 holds the telephone in place and maintains its connection to the interface device. In addition, the underside of the key defining flexible plane 102 includes rubber-like material (a silicone rubber edge for example or similar) so as to resist slipping over a table or similar support when force is applied in the direction of the telephone keys as distinct from the keyboard keys.

Figure 4:
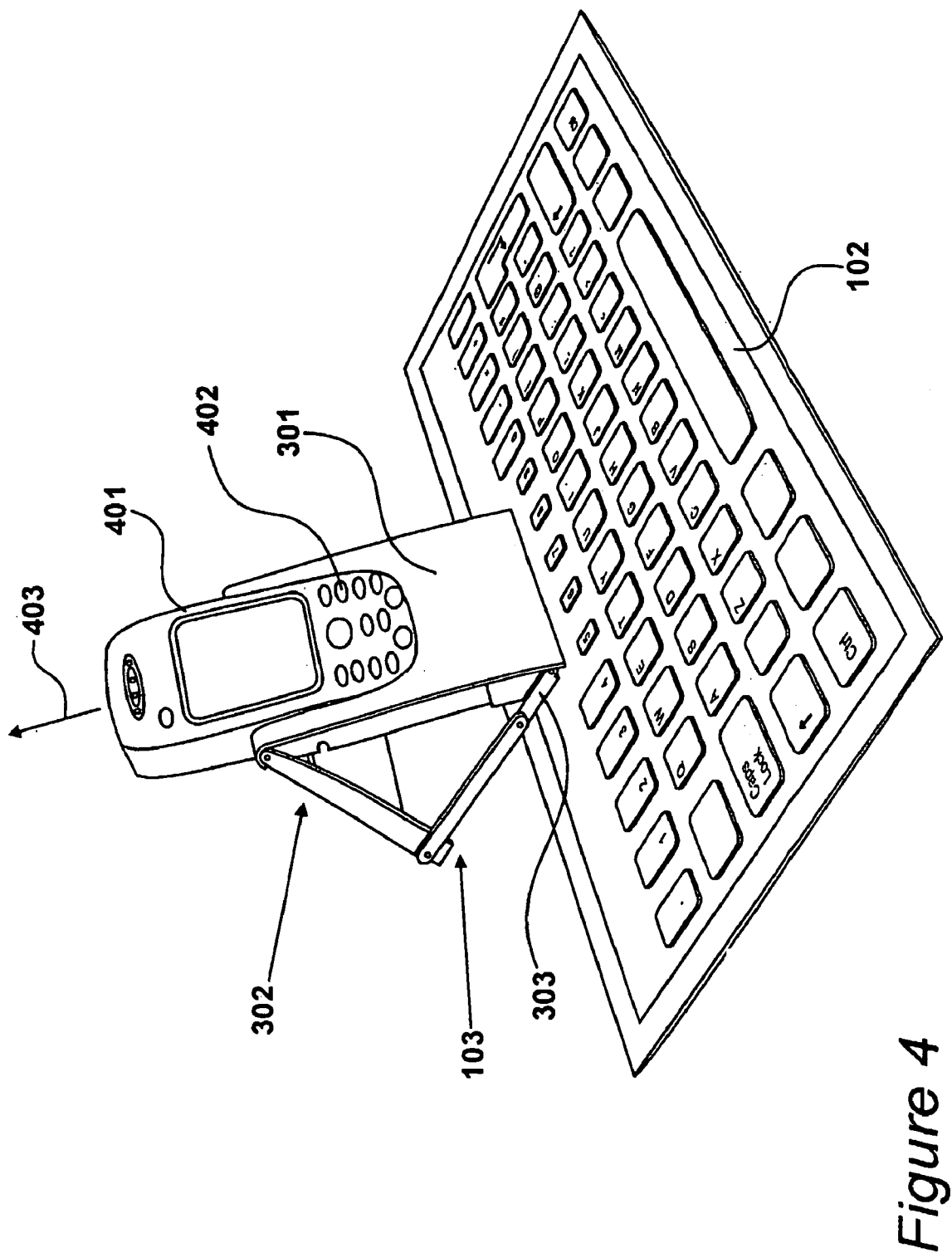
FIG. 4 shows the support device supporting a mobile telephone.

The rigid construction of the telephone support device 103 is facilitated because it is only desirable to have the telephone connected to the interface device when the foldable keyboard apparatus is unfolded into its supporting configuration as shown in FIG. 4. The flexible foldable nature of the keyboard provides portability such that, when folded, the keyboard may be stored easily in a handbag or pocket etc.

After use has been made of the keyboard apparatus, the mobile telephone 401 is removed by the application of a longitudinal force, in a direction shown generally by arrow 403. The mobile telephone may then be returned to a pocket or alternative storage location for continued use in its primary role, that is to say, for voice communication. As previously stated, the flexible keyboard, when folded, may be stored in another pocket and reconnection may be established, as described previously with reference to FIGS. 1 to 4, should additional text messaging be required. Thus, for example, a user may be prompted to assemble the device as previously described and generate text data in response to receiving a text message. A user therefore has significant benefits in that the flexible foldable keyboard detracts very little from the portability of the apparatus but, when connected, provides significant enhanced functionality given that the user now has access to a substantially full sized fully functional keyboard.

An alternative embodiment to using a fabric keyboard is described in international patent publication WO 01/75572, the contents of which is incorporated herein by reference. A similar disclosure is also included in co-pending U.S. patent application Ser. No. 09/980,236, the contents of which is also included herein by reference. In the alternative embodiment, the keyboard is a membrane keyboard having an uppermost layer of silicone rubber. This silicone rubber layer is laminated on its upper surface with a durable fabric layer onto which graphical icons and alpha numerics are printed. Alternatively, the uppermost layer is laminated with a durable flexible plastic film, such as a film of polyester or polyvinylchloride, onto which the graphics etc have been printed.

The alternative membrane keyboard includes a first electrically conductive membrane film and a second electrically conductive membrane film. In addition, a spacing membrane layer is positioned between the first electrically conductive membrane layer and the second electrically conductive membrane layer.

The first electrically conductive membrane layer is a film of MYLAR (polyethylene terephthalate). Electrodes are printed onto the underside of the film thereby forming a conductivity channel for the first electrically conductive membrane. The electrodes are connected to an interface circuit that supplies voltages to these electrodes via conductive tracks. Each electrode is specifically aligned so as to correspond with a key registration device on the outermost layer.

The second electrically conductive membrane layer is also composed of a MYLAR membrane having electrodes printed thereon. Each of the electrodes printed onto the upper surface layer is aligned with a corresponding electrode on the co-operating layer and a corresponding key registration device on the outermost layer.

A separator layer is provided in the form of a non-conductive membrane sheet of MYLAR with holes located to coincide with the positions of the co-operating electrodes. The separator layer prevents electrical contact occurring between the electrodes of the layers unless a mechanical interaction has occurred by the pressing of a specific key. Alternatively, the membrane layers may be made of alternative plastics materials.

FIG. 5

Figure 5:
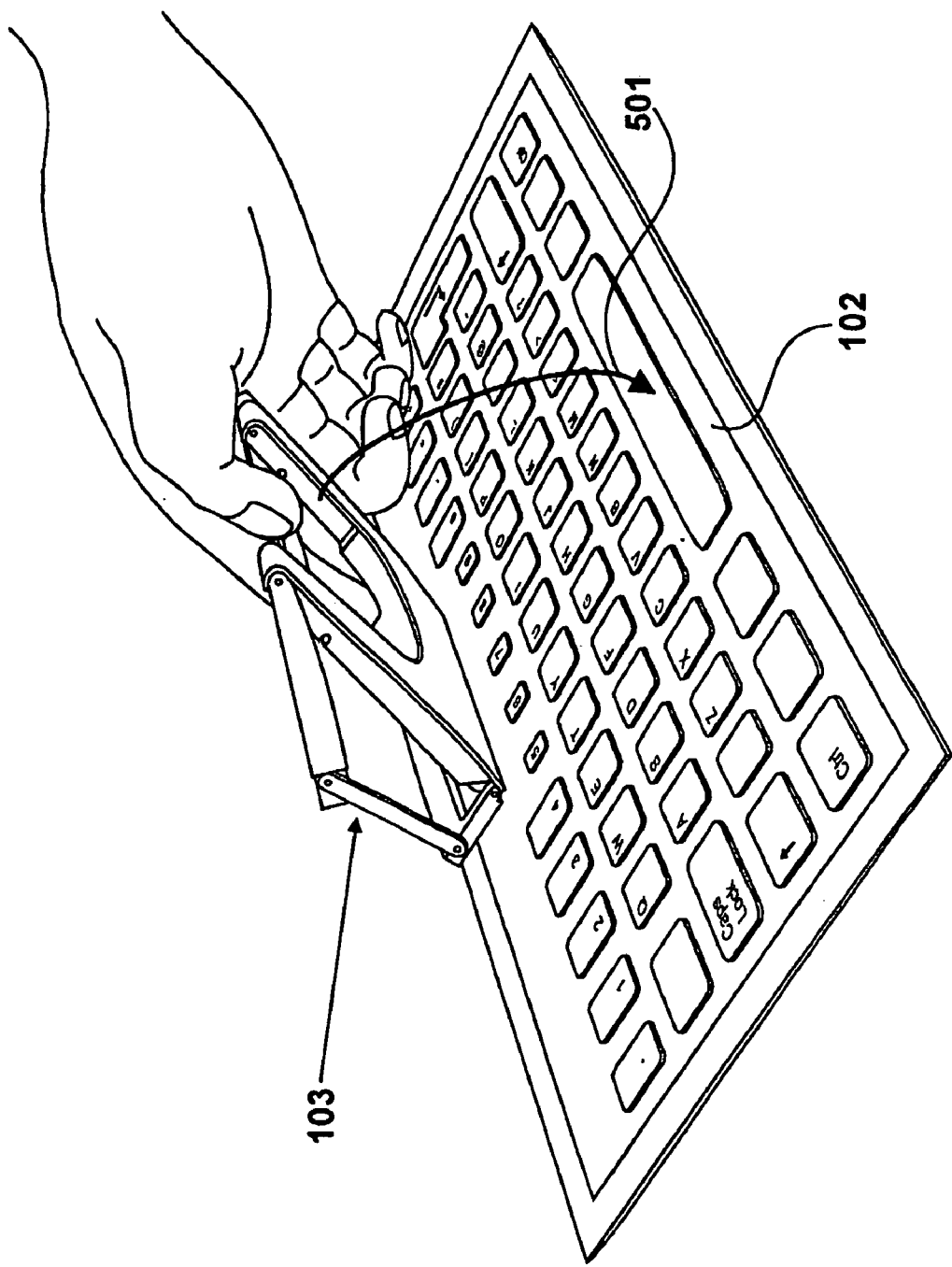
FIG. 5 illustrates the removal of the telephone from the support device.

After removing the mobile telephone from the support device, as previously described, the support device 103 is arranged to fold onto the key defining surface 102, as shown in FIG. 5. Thus, having removed the mobile telephone, manual force is applied substantially in the direction of arrow 501 in order to effect the folding of the support device onto the plane of the flexible keyboard 102. When in its folded configuration, the support device should add relatively little depth so as to minimise the size of the keyboard apparatus when wrapped. Typically, the thickness of the support device should be less than the thickness of a typical mobile telephone. However, when in its unfolded configuration, the support device should provide an opening that allows the mobile telephone to be received. The opening should be of a sufficient size only when the support device is fully open. In this way, the mobile telephone is guided into position so as to ensure satisfactory connection between the respective electrical connectors of the support device and the mobile telephone. This ensures that error-free data communication takes place and also ensures that the electrical connectors of the mobile telephone are not damaged. Thus, the telephone support device may be configured to guide a mobile telephone into a correct orientation.

FIG. 6

Having fully folded the telephone support device into the storage configuration for the device, the flexible keyboard is now wrapped around the folded support device in order to facilitate subsequent storage. This folding process is initiated by folding a first side of the keyboard 601 onto the telephone support device.

FIG. 7

Figure 6:
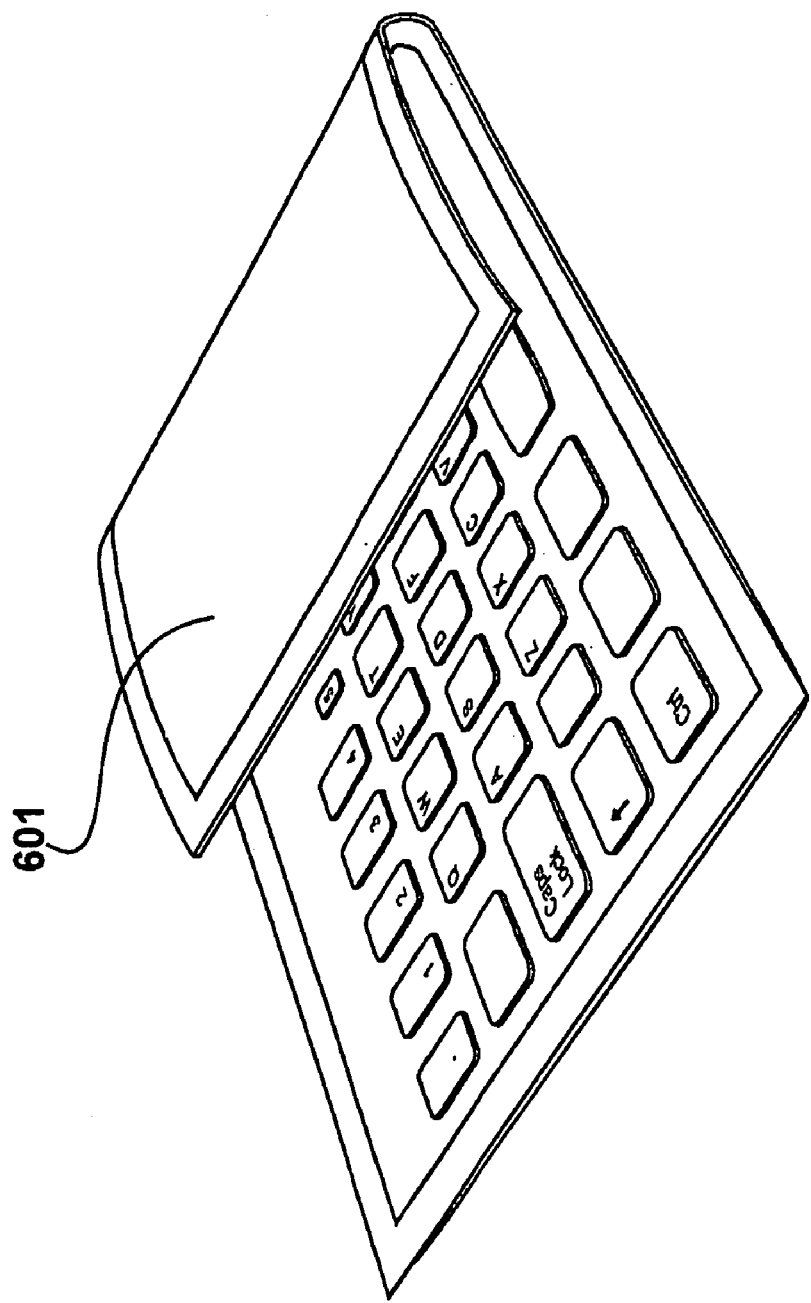
FIG. 6 shows the wrapping of the keyboard around the support device.
Figure 7:
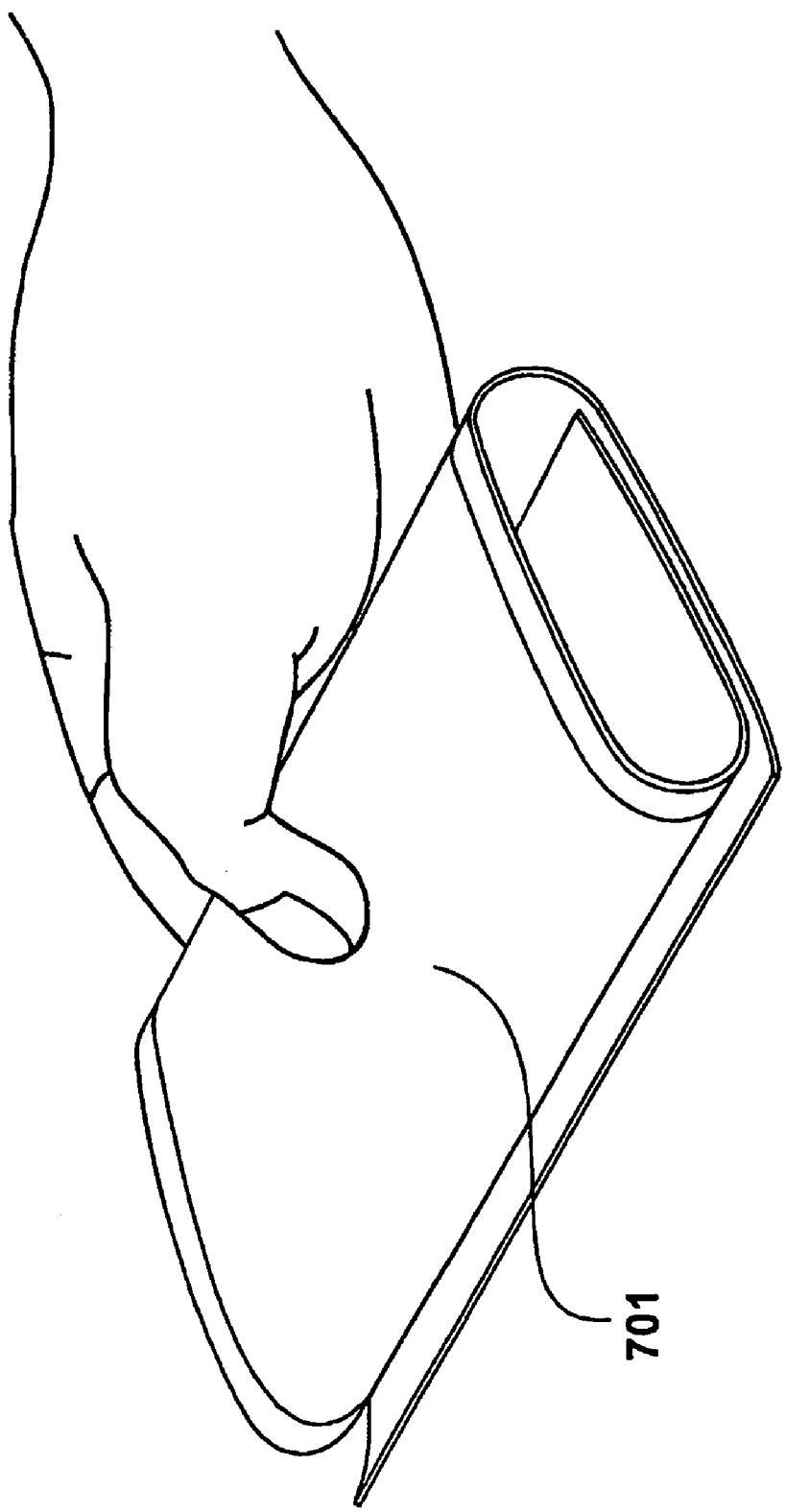
FIG. 7 shows the further wrapping of the keyboard around the support device.

Having made a first fold of the flexible keyboard as illustrated in FIG. 6, the opposing keyboard side 701 is folded over the first previously folded side so as to provide a relatively compact package, as shown in FIG. 7, that is easily stored in a pocket, handbag or similar device.

In its folded configuration, the flexible keyboard effectively provides a wallet for the support device for the mobile telephone. Consequently, this functionality could be extended to provide storage for other often transported items such as credit cards, business cards, currency, door keys, passes, driving licences and so on. Thus, this functionality could be facilitated by the provision of additional pockets within the foldable flexible keyboard apparatus within the support device itself.

FIG. 8

Figure 8:
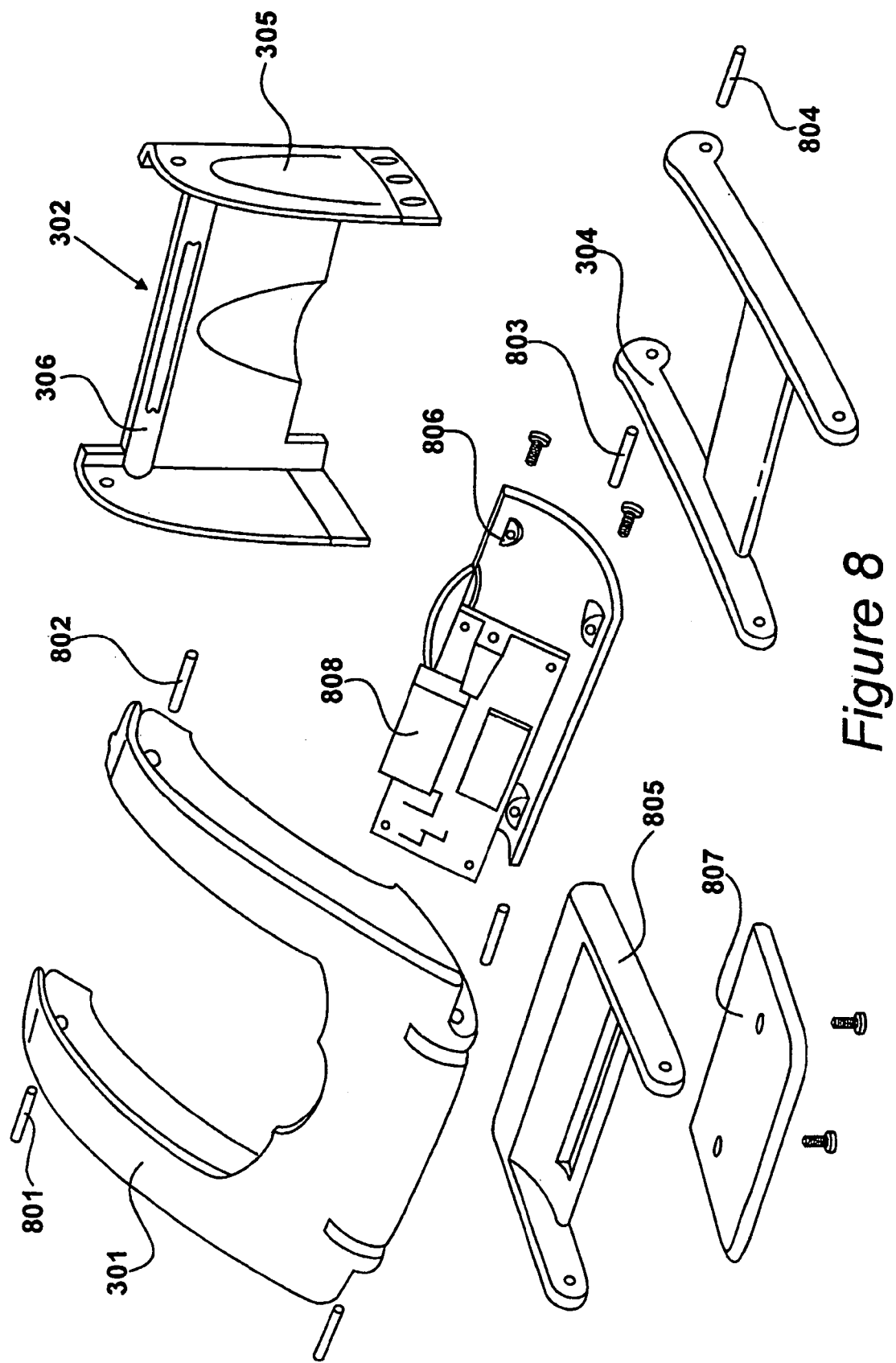
FIG. 8 details the construction of the support device.

A telephone support device 103 is detailed in exploded view in FIG. 8. Front supporting element 301 is connected to rear supporting element 302 by hinge pins 801 and 802. Similar pins 803 and 804 connect the extension arm 304 to the rear supporting element 302. The base connecting sub-assembly 303 consists of a sensor tail housing 805, a PCB cover 806 and a key mat clamp 807. PCB cover 806 covers a printed circuit board 808.

A keyboard designed for use with mobile telephony equipment may have slightly different configurations to keyboards used for other equipment, such as personal digital organisers. In particular, many mobile telephones do not include touch screens or similar devices and navigation between menus is achieved using specific navigation keys present within the mobile telephone itself. Consequently, in such circumstances, it is desirable to have similar navigation keys provided on the flexible keyboard.

The invention claimed is:

1. A flexible foldable keyboard apparatus configured to communicate with a mobile telephone, comprising:
    a key defining flexible plane,
    an interface device configured to connect with the electrical connectors of a mobile telephone, and
    a telephone support, said telephone support including a front portion connected to a rear portion by a hinge, said telephone support being connected to said key defining flexible plane in a manner to unfold from said key defining flexible plane to present a telephone supporting configuration for a mobile telephone in which said telephone support is configured to support a mobile telephone between the front portion and the rear portion and, after removing a secured mobile telephone, said telephone support is arranged to fold onto said key defining flexible plane into a storage configuration, to allow said key defining flexible plane to be wrapped around said folded telephone support, and
    said telephone support is configured to receive a mobile telephone between said front portion and said rear portion only when in the telephone support configuration.

2. A keyboard apparatus according to claim 1, wherein said key defining flexible plane includes a plurality of textile fabric layers.

3. A keyboard apparatus according to claim 1, wherein said key defining flexible plane includes conductive membrane films.

4. A keyboard apparatus according to claim 1, wherein said telephone support includes a base portion and an extension portion arranged in combination with said front portion and said rear portion to produce a substantially quadrilateral configuration.

5. A keyboard apparatus according to claim 4, wherein the base portion comprises a base connecting sub-assembly that provides physical connection between the telephone support and the key defining flexible plane.

6. A keyboard apparatus according to claim 5, wherein said base portion is a sub-assembly arranged to support a circuit board.

7. A keyboard apparatus according to claim 1, wherein said flexible foldable keyboard apparatus is configured to communicate with a mobile telephone having features to assist with the generation of text documents and electronic communications.

8. A keyboard apparatus according to claim 7, wherein said keyboard apparatus includes keys on said key defining flexible plane to assist menu navigation.

9. A keyboard apparatus according to claim 1, wherein said telephone support is less thick than a mobile telephone adapted to be used therewith when said telephone support is placed in its folded configuration.

10. A keyboard apparatus according to claim 1, further comprising an independent power supply for said key defining flexible plane.

11. A keyboard apparatus according to claim 10, wherein said power supply is constructed in a manner to receive recharging current from an external charging source.

12. A keyboard apparatus according to claim 11, wherein said interface device is connected in a manner such that said recharging current is also used to recharge a mobile telephone device.

13. A keyboard apparatus according to claim 1, wherein said keyboard apparatus comprises a storage pocket in said key defining flexible plane.

14. A keyboard apparatus according to claim 1, wherein said apparatus is configured to allow an electrical connection between electrical connectors of a mobile telephone and said interface device only when the mobile telephone is received between said front portion and said rear portion.

15. A keyboard apparatus according to claim 14, wherein said apparatus is configured to allow an electrical connection only when the mobile telephone is oriented between said front portion and said rear portion in a correct orientation.

16. A keyboard apparatus according to claim 15, wherein said telephone support is configured to guide a mobile telephone into a correct orientation between said front portion and said rear portion.

17. A keyboard apparatus according to claim 1, wherein folding of the telephone support is inhibited when a mobile telephone is received between the front portion and the rear portion.

18. A method of communicating text data to a mobile telephone using a flexible foldable keyboard, comprising the steps of:

unfolding a telephone support having a front portion connected to a rear portion by a hinge from a key defining flexible plane so as to present a telephone supporting configuration for a mobile telephone in which said telephone support is configured to support a mobile telephone between said front portion and said rear portion, locating said telephone between said front portion and said rear portion in a correct orientation, manually operating keys defined within said key defining flexible plane to input data, removing said telephone from said unfolded telephone support, folding said telephone support onto said key defining flexible plane, and wrapping said key defining flexible plane around said folded telephone support.

* * * * *